United States Patent Office 3,398,132
Patented Aug. 20, 1968

3,398,132
1:2-CHROMIUM COMPLEX MIXED AZO DYES
Johannes Dehnert, Ludwigshafen (Rhine), Germany, assignor to Badische Anilin- & Soda-Fabrik Aktiengesellschaft, Ludwigshafen (Rhine), Germany
No Drawing. Filed Oct. 18, 1965, Ser. No. 497,475
Claims priority, application Germany, Oct. 29, 1964, B 79,116
7 Claims. (Cl. 260—145)

ABSTRACT OF THE DISCLOSURE

A 1:2 chromium complex dye in which one atom of chromium is combined with one azo dye molecule and one disazo dye moleucule, the dye bearing a sulfonamide group. The resulting dyestuff is useful for dyeing cellulosic materials in the presence of a fixing agent.

---

The invention relates to 1:2-chromium complex dyes which contain two dye molecules combined with a chromium atom, one dye being a monoazo dye and the other a disazo dye of the formula

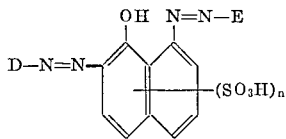

I in which D denotes the radical of a diazo component, i.e. a 2-aminophenol or 2-aminonapthol, E denotes the radical of a hydroxynaphthalene which couples in orthoposition and $n$ is one of the integers 1 and 2, the disazo dye bearing at least one unsubstituted sulfonamide group or a sulfonamide group bearing as sole substitutent an unsubstituted or substituted alkyl group.

Metal complex dyes having water solubilizing groups are used to a large extent for the dyeing of natural fibers such as wool. With these dyes especially dark shades can be obtained which have very good fastness including light fastness properties. In order to produce grey shades, a dye which in higher concentration gives a black dyeing can be used in small amounts. Light grey dyeings obtained in this manner however, usually have an insufficient light fastness. For the production of grey, olive and brown shades, mixtures of two or more colored (not black) dyes are also used, which mixtures may exhibit sufficient light fastness in light grey to brown shades.

The use of such mixtures, however, has considerable disadvantages. Since the speed at which each dye component of the mixture goes onto the fiber is often quite different, the concentrations of the components in the mixture change differently during the dyeing process. Thus, towards the end of the dyeing or especially in a continuous dyeing process, the initial ratio of the components cannot be maintained. Accordingly, a very undesirable change in the shade of a colored material can occur with such mixtures.

It was therefore an object of this invention to provide metal complex dyes which do not have these disadvantages, i.e. to provide dyes which do not consist of a mixture of two or more dyes and which nevertheless give colorings of light grey, olive or brown shades having high light fastness. As a further object of this invention, there are provided dyes which can be used for the fast grey to brown dyeing of cellulose fibers wherein the dyes are fixed in an alkaline medium via the sulfonamide group to the hydroxyl groups of the cellulose fibers by means of a crosslinking agent such as triacryloylformal.

These objects are achieved by dyes of the formula

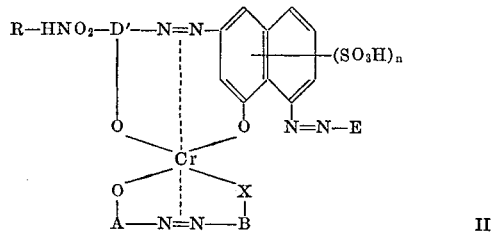

II where D' represents the radical of a diazo component of the 2-aminophenol or 2-aminonaphthol series, R represents hydrogen, alkyl, hydroxyalkyl or aminoalkyl, each of said alkyl groups having 1 to 3 carbon atoms, E represents the radical of a hydroxynaphthalene which couples in o-position to the hydroxy group, $n$ represents one of the numbers 1 and 2, A represents the radical of a diazo component of the benzene, naphthalene, pyrazolone or dihydroxyquinoline series, X represents the divalent radical —O— or —NH—, and A—N=N—B represents a monoazo dye with —O— and —X— attached in ortho position to the azo group.

Particularly advantageous results are obtained with the preferred range of dyes having the formula

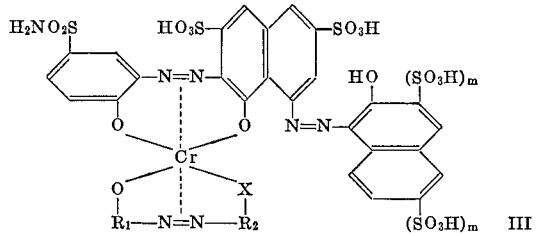

III where $R_1$ denotes the radical of 6-nitro-1-amino-2-hydroxynaphthalene-4-sulfonic acid, 4-nitro-2-hydroxy-1-aminobenzene, 5-nitro-1-amino-2-hydroxybenzene-3-sulfonic acid or 1-aminobenzene-2-carboxy-5-sulfonic acid, $R_2$ denotes the radical of 2-hydroxynaphthalene, 2-aminonaphthalene-5-sulfonic acid, 3-methylpyrazolone-(5) or 1-phenyl-3-methylpyrazolone-(5), X denotes —O— or —NH—, and $m$ denotes one of the integers 0 and 1.

In this formula the negative charges of the chromium atom in the complex as well as the negative charges of the sulfonic acid ions are compensated by colorless cations, for example alkali or ammonium ions especially sodium and potassium ions. For the sake of simplicity, the formulae throughout the specification are written without these cations, which have practically no influence on the properties of the dyes.

The dyes according to the invention may be prepared by reacting dyes having the formula

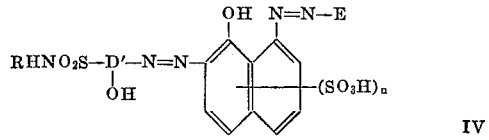

IV where R, D′, E, and n have the meaning given above, admixed with molar amounts of metalizable monoazo dyes of the formula

   V where A, B and X have the meaning given above, with agents supplying chromium so as to form 1:2 chromium complexes, or by reacting dyes having the Formula IV with agents supplying chromium to form 1:1 chromium complexes and adding on thereto dyes of Formula V.

The starting dyes having the Formula IV are obtained by conventional methods, e.g. by diazotizing diazo components of the formula

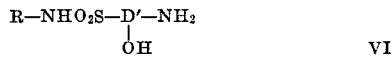   VI and coupling with compounds having the formula

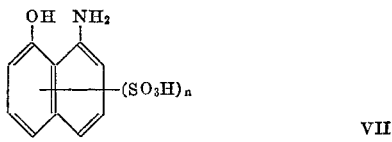   VII under alkaline conditions, again diazotizing the monoazo dyes and coupling with napthols E—H which couple in ortho position to the OH group to form disazo dyes.

Examples of diazo components R—HNO$_2$S—D—NH$_2$ are 2-aminophenols or 2-aminonaphthols which contain sulfonamide groups. The following specific examples may be given: the amides of 2-hydroxy-1-aminobenzene-4-sulfonic acid and 2-hydroxy-1-aminobenzene-5-sulfonic acid in which one sulfonamide hydrogen atom may be replaced by methyl, ethyl, 2-hydroxyethyl or 2-aminopropyl.

Examples of coupling components having the Formula VII are: 8-hydroxy-1-aminonaphthalene-3,6-disulfonic acid, 8-hydroxy-1-aminonaphthalene-4,6-disulfonic acid and 8-hydroxy-1-aminonaphthalene-4-sulfonic acid.

Examples of naphthalenes E—H which couple in ortho position to an OH group are 1-hydroxynapthalenes and 2-hydroxynapthalenes which may bear sulfonamide, sulfonic acid, carbamoyl and/or carboxylic acid groups. The following coupling components are given by way of example:

(1) With sulfonamide groups:

The amides of the following sulfonic acids (in which one hydrogen atom of the sulfonamide group may be replaced by methyl, ethyl, 2-hydroxyethyl or 3-aminopropyl (1)).

2-hydroxynaphthalene-4-sulfonic acid,
2-hydroxynaphthalene-6-sulfonic acid,
2-hydroxynaphthalene-3,6-disulfonic acid,
2-hydroxynaphthalene-6,8-disulfonic acid,
2-hydroxynaphthalene-3-carboxyphenylamide-3′-sulfonic acid,
2-hydroxynaphthalene-3-carboxyphenylamide-4′-sulfonic acid,
1-hydroxynaphthalene-4-sulfonic acid,
1-hydroxynaphthalene-4,8-disulfonic acid and
1-hydroxynapthalene-3,6-disulfonic acid.

(2) Without sulfonamide groups:

2-hydroxynaphthalene,
2-hydroxynaphthalene-4-sulfonic acid,
2-hydroxynaphthalene-6-sulfonic acid,
2-hydroxynaphthalene-3,6-disulfonic acid,
2-hydroxynaphthalene-6,8-disulfonic acid,
2-hydroxynaphthalene-3-carboxylic acid,
2-hydroxynaphthalene-3-carboxylic-2-hydroxyethylamide,
2-hydroxynaphthalene-3-carboxyphenylamide,
1-hydroxynaphthalene-3,6-disulfonic acid,
1-hydroxynaphthalene-4,2-disulfonic acid,
1-hydroxynaphthalene-4-sulfonic acid and
4-methoxy-1-hydroxynapthalene.

As dyes having Formula V there come into consideration especially those monoazo dyes which have one or more sulfonic acid groups in the diazo or coupling component or in both of them.

Diazo components

which belong to the o-hydroxyaminobenzene or o-hydroxyaminonaphthalene series are for example 4-nitro-2-hydroxy-1-aminobenzene, 6-nitro-1-amino-2-hydroxynaphthalene-4-sulfonic acid, 5-nitro-1-amino-2-hydroxybenzene-3-sulfonic acid, 1-aminobenzene-2-carboxy-5-sulfonic acid.

Coupling components for the preparation of dyes of Formula V and having the formula

are for example, 2-hydroxynaphthalene, 2-aminonaphthalene-5-sulfonic acid, 3-methylpyrazolone-(5), 1-phenyl-3-methylpyrazolone-(5).

Reaction of the disazo dyes according to this invention in admixture with dyes of Formula V with chromium or cobalt supplying agents is carried out by conventional methods in aqueous solution or suspension, in organic solvents or in mixtures of water and organic solvents, preferably at elevated temperature, if desired at superatmospheric pressure. It is also possible, depending on the reaction conditions chosen, to obtain first metal-containing dyes which contain only one molecule of a dye of Formula I in complex combination with one atom of metal. To these 1:1 metal complex dyes containing one molecule of a dye to one metal atom there is then added on in aqueous weakly acid, neutral or weakly alkaline medium, if desired with the addition of organic solvents, or solely in organic solvents, dyes of Formula V capable of forming complexes, at room or elevated temperature, and it is advantageous to use stoichiometric proportions. Similarly 1:1 chromium complexes of known azo dyes of Formula V may be reacted, preferably at elevated temperature, with metal-free disazo dyes having the Formula I.

Dyes obtainable according to this invention dissolve more or less readily in water or in organic solvents or in mixtures of the two. The dyes are outstandingly suitable for dyeing and printing cellulosic textile materials with the coemployment of polyfunctional reactive compounds, for example by the process of Canadian patent specification No. 675,862.

The invention is further illustrated by the following examples in which the parts specified are by weight. Parts by volume bear the same relation to parts by weight as the liter (S.T.P.) to the kilogram.

EXAMPLE 1

18.8 parts of 2-hydroxy-1-aminobenzene-5-sulfonamide is stirred with 75 parts of water. 15 parts by volume of concentrated hydrochloric acid, 100 parts of ice and, finally, 30 parts by volume of 23% sodium nitrite solution are added to this mixture. The whole is stirred for two hours at 0° to 5° C., the excess of nitrous acid is destroyed by adding dilute aminosulfonic acid solution and the diazotization mixture is gradually introduced into a solution of 29 parts of 1-amino-8-hydroxynaphthalene-3,6-disulfonic acid in 100 parts by volume of 4% caustic soda solution, 50 parts of ice and 30 parts of sodium carbonate having been previously added to the solution of the coupling component. After the coupling is over, the monoazo dye is precipitated by adding 60 parts by volume of concentrated sulfuric acid and suction filtered.

The dye paste obtained is dissolved in 500 parts by volume of 1.4% caustic soda solution, 30 parts of 23% sodium nitrite solution is added thereto and this mixture is allowed to flow during the course of one hour into a mixture of 70 parts by volume of concentrated hydrochloric acid, 150 parts of water and 200 parts of ice at 0° to 5° C. The whole is stirred for two hours at 0° to 5° C. and the excess of nitrous acid is then destroyed by adding aqueous aminosulfonic acid solution. The suspension of the diazo compound of the monoazo dye thus obtained is introduced gradually into a mixture of 15 parts of 2-hydroxynaphthalene dissolved in 300 parts by volume of 1.5% caustic soda solution, 200 parts of ice and 70 parts of sodium carbonate. When coupling is finished, the disazo dye is suction filtered, washed with a little water and dried at 80° C. at subatmospheric pressure. A dark powder is obtained which dissolves in water with a blue grey color and which gives fast grey dyeings when dyed onto wool from an acid dye liquor and afterchromed.

If the 15 parts of 2-hydroxynaphthalene is replaced by 25 parts of 2-hydroxynaphthalene-6-sulfonic acid, a similar dye is obtained.

EXAMPLE 2

The whole of the dye obtained according to Example 1 is stirred with 500 parts of water and 25 parts by volume of 25% ammonia solution at 50° to 60° C. Then the equivalent amount of the 1:1 chromium complex of the dye 4-nitro-2-hydroxy-1-aminobenzene → 2-aminonaphthalene-5-sulfonic acid (obtainable by a conventional method) is introduced and the whole is stirred at 60° C. until adding on is complete. The fact that this has taken place can easily be determined by paper chromotography. The whole is then evaporated to dryness. The dark powder obtained dissolves in water with a dull blue color and gives blue grey prints and dyeings having very good fastness on cellulose fiber cloth with an addition of polyfunctional reactive compounds, for example according to the process of Canadian patent specification No. 675,862.

1:2 chromium complexes having similar tinctorial properties are obtained by using the 1:1 complexes of the following dyes instead of the above-mentioned 1:1 complex:

| 1:1 complex of— | Shade of dyeing of the adduct |
| --- | --- |
| 6-nitro-1-amino-2-hydroxynaphthalene-4-sulfonic acid → 2-hydroxynaphthalene. | Grey. |
| 5-nitro-1-amino-2-hydroxybenzene-3-sulfonic acid → 2-hydroxynaphthalene. | Do. |
| 5-nitro-1-amino-2-hydroxybenzene-3-sulfonic acid → 3-methylpyrazolone-(5). | Brown. % |
| 5-nitro-1-amino-2-hydroxybenzene-3-sulfonic acid → 1-phenyl-3-methylpyrazolone-(5). | Do. |
| 1-aminobenzene-2-carboxylic acid-5-sulfonic acid → 3-methylpyrazolone-(5). | Olive. |

EXAMPLE 3

The procedure of Example 1 is followed but 32 parts of 2-hydroxynaphthalene-3,6-disulfonic acid is used as the coupling component instead of 15 parts of 2-hydroxynaphthalene. A dull violet disazo dye is obtained which is precipitated by adding 200 parts of concentrated hydrochloric acid.

The product is isolated and dried and dissolved in a mixture of 50 parts by volume of 25% ammonia and 1000 parts of water. The whole is heated to 50° to 60° C. and such an amount of the 1:1 chromium complex of 4-nitro-2-hydroxy-1-aminobenzene → 2-aminonaphthalene-5-sulfonic acid (obtainable by conventional methods) is gradually added as is required for complete adding on to form the unsymmetrical 1:2 chromium complex; this may easily be followed chromatographically.

When the reaction is over, the reaction solution is evaporated. The dark product obtained dissolves in water with a dingy blue color and dyes cotton fast blue grey shades according to the process of Canadian patent specification No. 675,862.

EXAMPLE 4

A solution of the total amount of the disazo dye obtained according to Example 1 in 2000 parts of water and a solution of 31 parts of 24.5% chromium oxide hydrate in 28 parts of 98% formic acid and 120 parts of water are stirred together in an autoclave at 120° C. for three hours. The reaction mixture is allowed to cool and the chromium-containing dye is suction filtered, washed with a small amount of dilute hydrochloric acid and dried. It is a grey black powder which is soluble in hot water and dyes wool from a dye liquor acidified with sulfuric acid grey to black shades having outstanding fastness properties. When applied to synthetic polyamide it exhibits similar tinctorial properties.

I claim:
1. A dye of the formula:

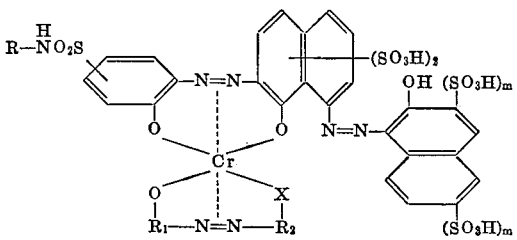

where

R represents a member selected from the group consisting of hydrogen, alkyl, hydroxyalkyl and aminoalkyl, each of said alkyl groups having 1 to 3 carbon atoms;

$m$ represents one of the numbers 0 and 1;

X represents a divalent radical selected from the group consisting of —O— and —NH—;

$R_1$ represents the radical of a diazo component selected from the group consisting of 6-nitro-1-amino-2-hydroxynaphthalene-4-sulfonic acid, 4-nitro-2-hydroxy-1-aminobenzene, 5-nitro-1-amino - 2 - hydroxybenzene-3-sulfonic acid, 1-aminobenzene - 2 - carboxy-5-sulfonic acid; and $R_2$ represents the radical of a coupling component selected from the group consisting of 2-hydroxynaphthalene, 2-amino-naphthalene-5-sulfonic acid, 3-methylpyrazolone-(5), 1-phenyl-3-methylpyrazolone-(5).

2. A dye of the formula

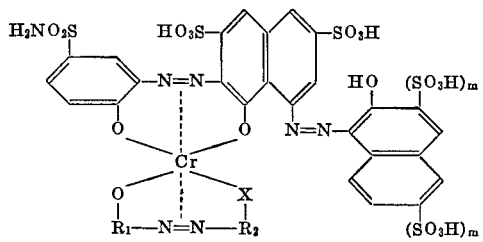

where $R_1$ represents the radial of a diazo component selected from the group consisting of 6-nitro-1-amino-2-hydroxynaphthalene-4-sulfonic acid, 4 - nitro - 2 - hydroxy - 1-aminobenzene, 5-nitro-1-amino - 2 - hydroxybenzene-3-sulfonic acid, 1 - aminobenzene-2-carboxy - 5 - sulfonic acid;

$R_2$ represents the radical of a coupling component selected from the group consisting of 2-hydroxynaphthalene, 2-aminonaphthalene-5-sulfonic acid, 3 - methylpyrazolone-(5), 1-phenyl-3-methylpyrazoline-(5);

X represents a divalent radical selected from the group consisting of —O— and —NH—; and $m$ is one of the numbers 0 and 1.

3. The dye of the formula
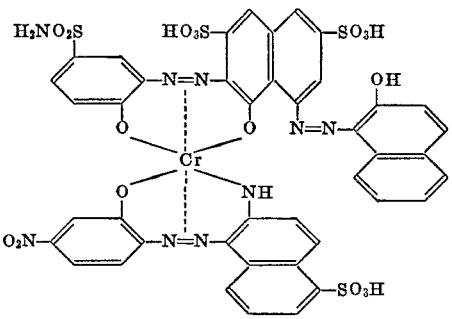
4. The dye of the formula
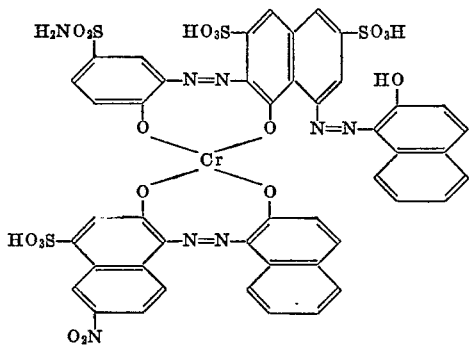
5. The dye of the formula
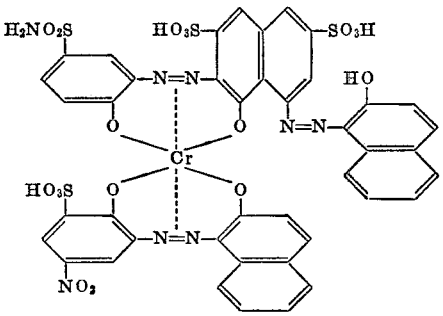
6. The dye of the formula
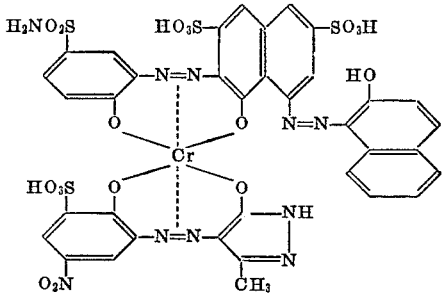
7. The dye of the formula
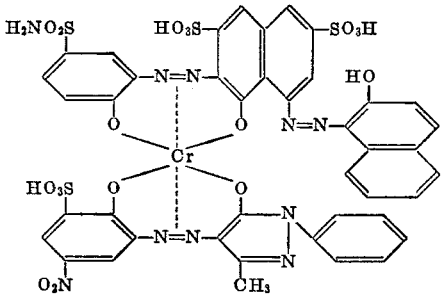
References Cited
FOREIGN PATENTS
851,861  10/1960  Great Britain.
CHARLES B. PARKER, *Primary Examiner.*
D. PAPUGA, *Assistant Examiner.*

UNITED STATES PATENT OFFICE
CERTIFICATE OF CORRECTION

Patent No. 3,398,132                              August 20, 1968

Johannes Dehnert

It is certified that error appears in the above identified patent and that said Letters Patent are hereby corrected as shown below:

Column 2, formula II should appear as shown below:

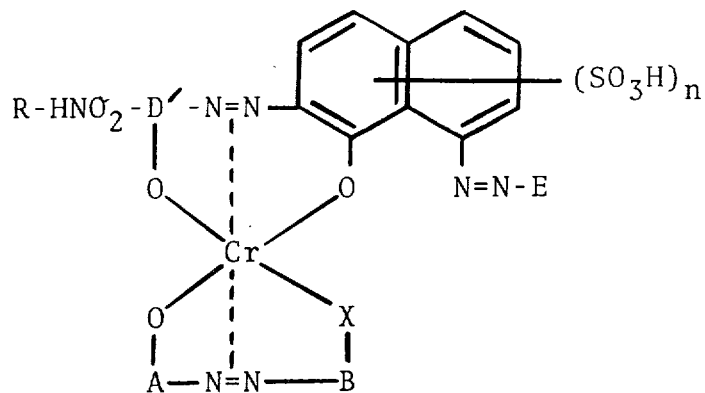

Column 3, line 73, "4,2-disulfonic" should read -- 4,8-disulfonic --. Column 5, line 49, "Brown. %" should read -- Brown. --.

Signed and sealed this 28th day of April 1970.

(SEAL)
Attest:

EDWARD M. FLETCHER, JR.                      WILLIAM E. SCHUYLER, JR.
Attesting Officer                               Commissioner of Patents